No. 869,795. PATENTED OCT. 29, 1907.
G. S. MORISON.
BRAKE ACTUATING APPLIANCE TO OPERATE WHEN A VEHICLE LEAVES THE TRACK IN RAILROADS.
APPLICATION FILED JULY 13, 1907.
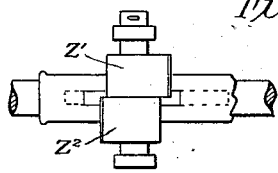
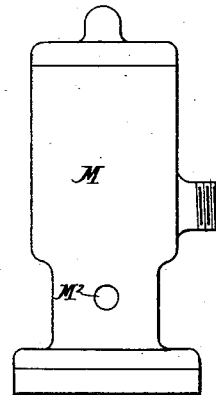
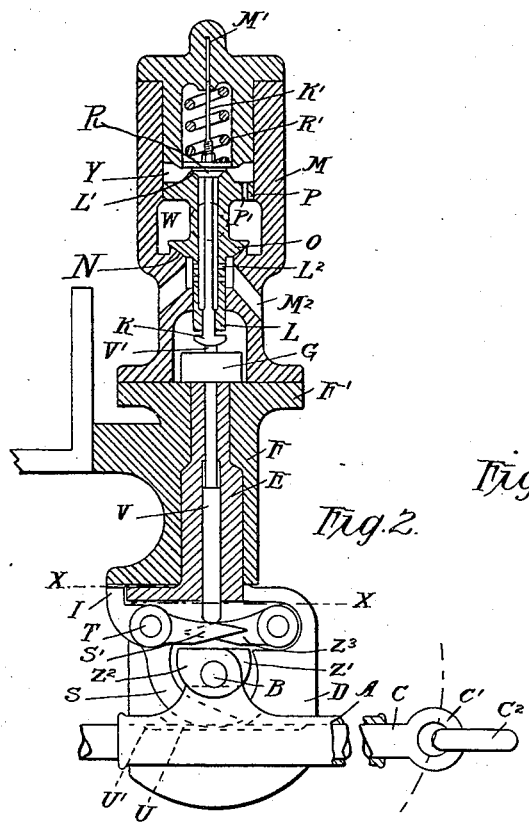
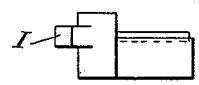
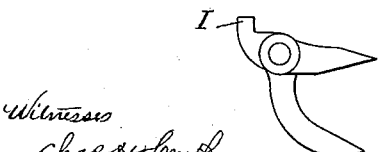
Witnesses
Chas. H. Smith
A. H. Serrell
Inventor
George Smith Morison
per Harold Serrell
his atty
THE NORRIS PETERS CO., WASHINGTON, D. C.

UNITED STATES PATENT OFFICE.

GEORGE SMITH MORISON, OF MELBOURNE, VICTORIA, AUSTRALIA.

BRAKE-ACTUATING APPLIANCE TO OPERATE WHEN A VEHICLE LEAVES THE TRACK IN RAILROADS.

No. 869,795.  Specification of Letters Patent.  Patented Oct. 29, 1907.

Application filed July 13, 1907. Serial No. 383,681.

*To all whom it may concern:*

Be it known that I, GEORGE SMITH MORISON, a subject of the King of Great Britain, residing at 29 William street, Melbourne, in the State of Victoria, Australia, have invented certain new and useful Improvements in Brake-Actuating Appliances to Operate When a Vehicle Leaves the Track in Railroads; and I do declare the following to be a full, clear, and exact description of the invention, such as will enable others skilled in the art to which it appertains to make and use the same.

This invention has been devised to provide appliances which will act automatically in applying a brake actuated either pneumatically, hydraulically or electrically.

My apparatus is designed so that when a preceding or even a following vehicle, in a train leaves the track and assumes an extraordinary angle its mechanism will be actuated so that the valve or switch controlling the power with which the brakes are operated will be so lifted or moved as to turn on or off such brake actuating power and cause the brakes in all the vehicles in the train to be synchronously applied and thus reduce the momentum of such vehicles and prevent further accident.

In order that my invention may be the more easily understood reference may be made to the accompanying drawings, in which—

Figure 1 is a front elevation of one form of apparatus embodying my invention. Fig. 2 is a side elevation in section of Fig. 1. Fig. 3 a detail in the above figures. Fig. 4 a plan (partly in section) on line X—X of Fig. 2, while—Figs. 5 and 6 are also illustrations of detail parts.

In these drawings A is a hollow shaft centered at B and capable of describing an arc as shown by dotted lines on Fig. 2.

C is a linked rod fitting in the hollow shaft A and free to move or slide longitudinally in same. At the end of C is an eyelet C' through which a link $C^2$ passes, the latter being sized to pass over a conveniently shaped hook placed at the back of the preceding or following vehicle. It is intended that each vehicle (including the engine) composing the train should be fitted in front and back with one of these apparatus and correspondingly a hook is placed at the front and back of each vehicle to receive the link $C^2$ when the vehicles are coupled together. A bifurcated cheek piece D contains the center pin B before mentioned and forms part of or is rigidly secured to a vertical hollow shaft E and it will be seen that the shaft E is free to rotate radially in standard bearing F and F' and is kept in its vertical position by collar G rigidly attached to or forming part of the shaft E. The collar piece G being fixed to the top end of the hollow shaft E will rotate therewith and the rotating in either direction (in accordance with the leverage given to it) by the hollow shaft A first before mentioned will engage the pawl I centered upon a bearing pin T and will lift its headpiece S'. The latter comes in contact with the head of the depending spindle V. The said spindle will be lifted and communicate its upward movement to the valve R which is fixed to the spindle K. The under side of the inverted mushroom head of the spindle K comes in contact with the bottom of the hollow spindle L and will lift same with the valve O to which it is attached and also the piston P to which it is also attached. It will be seen that the pawl I in rotating with the cheek piece D comes into contact with the inclined plane Z (see Fig. 1) which lowers pawl I and lifts its headpiece S', communicating its motion to the rod V.

Referring to the hollow spindle A on its center B (Fig. 2) it will be noted that two shoulders Z' and $Z^2$ are part thereof and that in any vertical movement the said shoulders engage with corresponding shoulders on the parts S' and $Z^3$ and will communicate an upward movement to the internal spindle V.

A cylinder M fitted with a valve seat N for the valve O surrounds the piston P and is turned to neatly fit said piston. Referring to the piston P a small hole or perforation P' proceeds vertically through it. The spindle K it will be seen is fitted into the hollow of the hollow spindle L and is free to move vertically in same and to open the small valve R at its top. This valve is kept down upon its seat L' by the expanding energy of a coiled spring R' which surrounds its spindle K' which latter is in fact the termination of the rod K and is guided in the bore M' of the cylinder M. S is a pawl or trigger and hangs from the center pin or spindle T. Its bottom is so formed as to enter into a slotted groove U cut into the top of the rod C and is arranged to engage with a shoulder U' at one end of the said groove U so that when the rod C is drawn forward the shoulder U' catches the bottom of S and causes the head piece S' of S to push up the internal spindle V. The latter at V' raises and so operates the mushroom head of K. Reverting to the hollow spindle L it will be seen that it is perforated at $L^2$ for the escape of the pressure fluid (or inversely for the influx of air should a vacuum brake be used). These ports $L^2$ are in open communication with the lead out ports $M^2$. Referring to the perforation P'. I would explain that such perforation passes through the entire depth of the piston.

When the spindle K and its valve R are lifted the pressure of air in the chamber Y is reduced by its exit to the atmosphere caused by the lifting of the valve R which passes through the hollow spindle L and the ports L². This causes difference of pressure between the upper and under side of the piston P causing the piston P with its valve O to be immediately raised by the excess of pressure in the chamber W, allowing the pressure in the chamber W to escape through the ports M², the area of the piston P being in excess of the area of the valve O on its seat N.

I would have it understood that where a brake other than pneumatic pressure brake is used or an electric switch is to be operated then the actuating valves shoulders or switches will be controlled or operated by the action of V and in which case all the parts illustrated by me above such portion in the figures may be left out and the necessary respective modification employed in lieu thereof.

In operation when the preceding vehicle (the engine for instance) leaves the rail and causes the rod C and casing A to be moved radially in either the horizontal or vertical direction the mechanism hereinbefore described will come into operation and instantly cause the brakes throughout the train to operate and arrest the momentum of their respective vehicles. It will be seen therefore that where my apparatus is employed the danger of one vehicle colliding with another or any other obstruction where the vehicle leaves its track is obviated or minimized. I would also have it understood that should the chain or screw coupling break between any two vehicles in the train the rod C being drawn forward by its hook will cause the trigger S to be operated by the shoulder U′ so that the part S′ will bring about brake action throughout the train.

I claim as my invention:

1. In brake appliances, a centered radially working arm, a valve actuating spindle or rod, said arm being linked to the next respective vehicle in the train and so arranged that upon its being rotated unduly in either a vertical or horizontal direction, the valve actuating spindle or rod will be actuated to turn on or shut off the power to operate the brakes, substantially as and for the purposes set forth.

2. In brake appliances, in combination, a sliding rod C having therein a shoulder groove U, a pawl or trigger S, a spindle or rod V, and means actuated by the motion of the rod V for turning on and shutting off the power operating the brakes, substantially as and for the purposes set forth.

3. In brake appliances, in combination, a sliding rod C, a hollow shaft A centered at B, a pawl or trigger S, a spindle V, a vertical hollow shaft E, a valve R, and means for communicating the motion from the spindle V or hollow shaft E to the said valve, substantially as and for the purposes set forth.

4. In brake appliances, in combination, a valve actuating spindle V, a vertical hollow shaft E, a valve rod K, means such as V′ for communicating movement from V or E to the said valve rod K, a cylinder M and a piston P mounted upon a hollow shaft L and free to move up or down in the cylinder M and having through the same a perforation P′, substantially as and for the purposes set forth.

5. In brake appliances, in combination, a valve actuating rod K, valve R, piston P mounted upon a hollow shaft L and having ports L² therein, a cylinder M, and a valve seat N, a valve O, and a hollow spindle L, upon which the valve O is set and adapted to seat itself upon the valve seat N, substantially as and for the purposes set forth.

6. A brake operating mechanism comprising a pivotally mounted arm adapted to swing both horizontally and vertically, power controlling devices, and means actuated by any undue movement of said pivotally mounted arm for operating the said power controlling devices.

In testimony whereof I have signed my name to this specification in the presence of two subscribing witnesses.

GEORGE SMITH MORISON.

Witnesses:
ALICE HARKER,
FLORENCE SINCLAIR.